United States Patent [19]

Vladkov et al.

[11] Patent Number: 4,975,801

[45] Date of Patent: Dec. 4, 1990

[54] AUTOMATIC BY-PASS FOR TELEVISION COMPONENTS

[75] Inventors: Emil P. Vladkov; Dobri D. Mihaylov, both of Sofia, Bulgaria

[73] Assignee: Bulgarska Televisia Kam Komitet SA Televisia I Radio, Sofia, Bulgaria

[21] Appl. No.: 295,259

[22] Filed: Jan. 9, 1989

[30] Foreign Application Priority Data

Jan. 12, 1988 [BG] Bulgaria .................................. 82604

[51] Int. Cl.$^5$ ............................................ H01H 47/22
[52] U.S. Cl. ..................................... 361/187; 361/190
[58] Field of Search ............... 361/160, 166, 170, 187, 361/189, 190, 117, 118, 119

[56] References Cited

U.S. PATENT DOCUMENTS

| | | | |
|---|---|---|---|
| 4,254,705 | 3/1981 | Ishikawa et al. | 361/187 |
| 4,291,356 | 9/1981 | Mathieu | 361/187 |
| 4,736,145 | 5/1985 | Sakurai et al. | 361/187 |

*Primary Examiner*—Philip H. Leung
*Assistant Examiner*—Jeffrey A. Gaffin
*Attorney, Agent, or Firm*—Herbert Dubno

[57] ABSTRACT

An automatic bypass for studio TV operation of linear devices (noise suppressors correction, etc.) having the advantage, unlike the known devices in this field, of reacting in case of processing unit supply failures and taking into consideration the change of the output signal parameters as a result of deteriorated operation or dropping of the output signal due to defect. The system provides stable switching when there is unstable or intermittent supply which may comprise the signal transmission. The electromagnetic relay of the bypass is connected to negative and positive supply poles connected to a two-stage differential amplifier coupled to the signal output of a processing unit, and the actuation of the electromagnetic relay is actuated across a voltage translator and electronic switches connected in series, the output of the first switch is also connected to the control input of voltage translator and to ground across a capacitor.

3 Claims, 1 Drawing Sheet

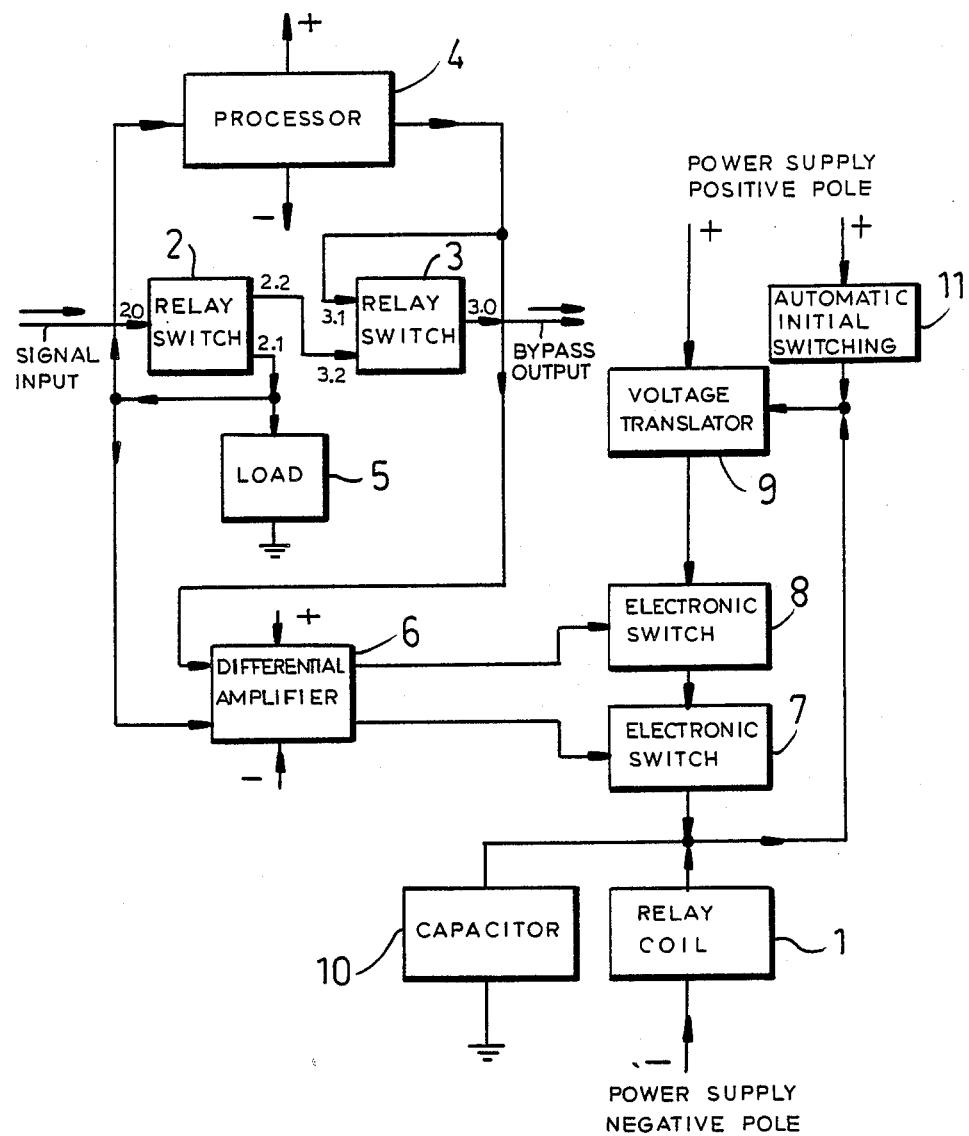

AUTOMATIC BY-PASS FOR TELEVISION COMPONENTS

FIELD OF THE INVENTION

This invention relates to an automatic BY-PASS because in studio television equipment for broadcasting or for emergency situation support in the television path, e.g. linear devices for signal processing (noise suppression, insertion, correction or the like, where the low frequency signal energies and certain medium frequency signal energies are not greatly changed.

BACKGROUND OF THE INVENTION

There is well known automatic by-pass (Philips Company Catalogue PTV Professional Television Measuring Equipment, 1986–1987, p. 109) consisting of an electromagnetic relay with two contact switches where the common pole of the first contact switch is connected to the signal input, its operative pole being connected to the input of the processing unit and the load which, by its second end is connected to the ground of the input line, its non-activated pole being connected to the non-activated pole of the second contact switch, the operating pole of which is connected to the output of a processing unit and its common pole is an output of the automatic By-pass. The electromagnetic relay with its coil is connected to the positive and negative poles of the supply.

A disadvantage of the well-known automatic By-pass is that it reacts only when there is no supply from the processing unit, fully or partially, and does not consider any parameter change of the output signal, e.g. as a result of a deteriorating operation of failure of the output signal due to a defect. Another disadvantage is the possibility of unstable multiple reswitching, in case of an unstable or interrupted power supply which may jeopardize the signal transmission.

OBJECT OF THE INVENTION

It is the objective of this invention to make an automatic by-pass having improved function as expressed by following the state of the signal parameters, and in case of unstable operating, including the power supply can get into a stable switched state which can guarantee the uncompromised signal transmission.

SUMMARY OF THE INVENTION

The invention provides an automatic by-pass containing an electromagnetic relay with two contact switches. The common pole of the first contact switch is connected to the signal input, its operating pole is coupled to the processing unit input and to the load, the second end of which is its non-actuated pole connected to the non-actuated pole of the second contact switch, the operating pole of which is connected to the processing unit output and its common pole is an output of the automatic by-pass. The electromagnetic relay is connected to the positive and negative poles of the power supply. The operating pole of the first contact switch is connected to one of the two inputs of a two-stage differential amplifier with differential output, the other input of which is connected to the signal output of the processing unit. Both its differential outputs are connected to the control inputs of two electronic switches. The positive supply pole is connected to the one end of the electromagnetic relay coil across a voltage translator and the two electronic switches are connected in series. One of the switches is also coupled to the control input of the voltage translator and across a capacitor to ground.

A unit for automatic initial switching is connected between the positive supply pole and the translator control input.

The advantage of the automatic by-pass, according to this invention is the extension of its functional expressed on one hand by the continuous following of the basic parameters of the output signal of the redundancy units towards the input signal including its constant signal component including level and γ-distortions and, on the other hand, by a stable disconnection of the redundancy unit and switching of the by-pass operation when certain value of the controlled parameters or of the supply voltages change. These qualities guarantee the high functional reliability of the television path.

BRIEF DESCRIPTION OF THE DRAWING

The sole FIGURE of the drawing is a block diagram illustrating an automatic bypass of the invention.

DESCRIPTION

The Automatic By-pass has an electromagnetic relay 1 having two contact switches 2,3. The common pole 2.0 of first contact switch 2 is connected to the signal input, and its operating pole 2.1 being connected to the input of processing unit 4 and the load to grounding 5 of the input line. Its non-activated activated pole 2.2 is connected to the non-activated pole 3.2 of the second contact switch 3, the operating pole 3.1 of which is connected to the signal output of processing unit 4, and its common pole 3.0 is connected to the automatic by-pass output. The coil of electromagnetic relay 1 is coupled to the positive and negative supply poles. Operating pole 2,1 of the first contact switch 2 is connected to one of the two inputs of a two-stage differential amplifier with a differential output 6, the other input of which is connected to the signal output of processing unit 4. Both its differential outputs are connected to the control inputs of two electronic switches 7, 8. The positive pole of the supply is connected to the coil of relay 1 across voltage translator 9 and the two electronic switches 8, 7 connected in series. First switch 7 is coupled to the control input of voltage translator 9 and across capacitor 10 to grounding.

A unit for automatic initial switching 11 is connected between the positive supply pole and the control input of voltage translator 9.

The automatic by-pass operates as follows:

In a good operation mode of processing unit 4 corresponding to a state in which relay 1 is energized, operating contacts 2.0-2.1 3.0-3.1 are corrected whereby the input signal is connected to the input of processing unit 4. The latter's output is an output of the automatic by-pass. The inputs of differential amplifier 6 are connected to the input and output, respectively, of processing unit 4. When the latter's input and output signals are the same, the outputs of differential amplifier 6 have the same DC voltages. These voltages, together with the positive supply translated by translator 9 keep electronic switches 7, 8 energized so that relay 1 remains activated to retain the above-mentioned operating state of switches 2, 3.

When there is a difference between the signals across the inputs of differential amplifier 6 as a result of incorrect function of processing unit 4, the difference is amplified in such a way that the output voltages of differential amplifier 6 no longer remain the same and constant. Depending on the sign of the difference across the input of differential amplifier 6, the control voltages of electronic switches 7, 8 change switching off the first electronic switch 7 and switch on the second electronic switch 3, or conversely, the second switch 8 is switched off and the first switch 7 is on. In case of any difference between the input and output signals above a specific value, depending on its sign, one of the two electronic switches 7, 8 is switched off so that electromagnetic relay 1 shall remain disabled and negative voltage shall be supplied to the control input of translator 9 across the relay winding. Translator 9 then shifts its output voltage towards the negative pole which would guarantee a stable off state of both electronic switches 7, 8, Simultaneously switches 2, 3 go to non-activated state and connecting non-activated contacts 2.0-2.2,-3.0-3.1 as a result of which the signal shall go directly from the input to the output bypassing the processing unit 4.

When it is considered that the input and output signals of processing unit 4 even in the presence of color carrier can never be equal in phase, and in high frequency treatment and by amplitude which often includes the basic function of the processing unit, e.g. a corrective amplifier, the differential amplifier 6 should have a low-pass filter response, having about a 2 MHz section frequency in which it becomes insensible to any differences outside the pass range, thereby guaranteeing its normal function.

On the other hand, any delay between the output and the input signals of processing unit 4 forms considerable amplitude differences, particularly in brightness dynamics signals, which causes peaks resulting in the turning off of switches 7,8. Still greater is the effect as a result of any essential functional difference, e.g. in graphic information, characters, etc. after information fed to the processing unit 4.

To eliminate any affect of a closing pulse of switches 7,8 on the potential on relay 1 we provide an integration effect by the capacitor 10 which simultaneously maintains the normal operating mode of translator 9. The necessary sensitivity of the automatic by-pass can be selected by the suitable choice of capacitor 10. In all cases its capacity has a relatively weak effect on the sensitivity of the DC I/O levels and for low frequencies which carry the greatest part of the signal energy and are reliable for the control of the exemplary parameters given above. Sensitivity can be regulated by determining the differential amplifier transmission coefficient. When there is natural difference between the input DC level and the level in processing unit 4, the same difference can be offset in advance by shifting the operating point of differential amplifier 6.

The automatic by-pass function is preserved in case of any failure or fluctuation of the supply voltages.

Automating connection is guaranteed by the automatic initial starting unit 11 which keeps a high positive potential of the control input of translator 9 until a state is established of switching on of electronic switches 7, 8 after which its action is terminated by its own time constant.

Manual operative control of the automatic by-pass can be made as follows:- Secondary switching to processing mode operating by short-time contact between the input and output of translator 9; Switching off of automatic signal comparison by switching on the positive supply voltage by means of a resistor in series with relay 1; exclusion of the processing unit function by disconnection of the negative supply pole to relay 1 (the above functions are not illustrated in the Figure).

It is advantageous that the voltage translator 9 be an emitter repeater of its control voltage with a npn transistor and that the electronic switches 7,8 is provided with pnp transistors. Antipolar combination of the same components is also possible.

Additional effect of this invention can also be produced by using differential amplifier 6 which can have amplification in the order of 100 or more, for the adjustment and testing the parameters of processing unit 4 where zero adjustment is required of the differences of one of the outputs of the differential amplifier 6. The external automatic signal comparison function, described above, is ruled out.

We claim:

1. An automatic bypass system for a signal processor comprising, in combination with said signal processor having a processor input and a processor output:

an electromagnetic relay having a relay coil and a first contact switch and a second contact switch actuated by said coil, said contacts each having a common contact, an operative contact connect to said common contact upon energization of the respective coil, and an inactive contact connected with said common contact upon deenergization of said coil, said common contact of said first contact switch being connected to a signal of the system, said operative contact of said first contact switch being connected to said signal input of said processor, said inactive contact of said first contact switch being connected to said inactive contact of said second contact switch, said operative contact of said second contact switch being connected to said signal output of said processor, and said common contact of said second contact switch being connected to a signal output of the system;

a differential amplifier having a pair of differential inputs and a pair of differential outputs, one of said differential inputs being connected to said signal input of said processor, and the other of said differential inputs being connected to said signal output of said processor;

a source of a supply voltage;

a first electronic switch and a second electronic switch connected in series with one another between said source and said coil, one of said differential outputs being connected to a control input of one of said electronic switches, and the other of said differential outputs being connected to a control input of the other of said electronic switches whereby both of said electronic switches are held conductive by said differential amplifier upon relative agreement of input signals with output signals across said processor whereby said coil is held energized and said operative contacts are connected to the common contacts of said relay and, upon substantial disagreement of input signals with output signals across said processor, said differential amplifier switches at least one of said electronic switches to a nonconducting state, thereby deenergizing said coil and bypassing signals from said signal input of the system to the signal output of the system through electrical connections between said common contacts and said inactive contacts; and a capacitor connected between ground and a junction between one of said electronic switches and said coil.

2. The automatic bypass system defined in claim 1 wherein said source comprises a power supply and a voltage translator in series with said supply and said electronic switches.

3. The automatic bypass system defined in claim 2, further comprising an automatic initial starting switch is connected between said supply and a control input of said voltage translator.

* * * * *